United States Patent
Takato

(10) Patent No.: US 11,661,053 B2
(45) Date of Patent: May 30, 2023

(54) VEHICLE AND VEHICLE CONTROL METHOD

(71) Applicant: TOYOTA JIDOSHA KABUSHIKI KAISHA, Toyota (JP)

(72) Inventor: Miyuki Takato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/470,229

(22) Filed: Sep. 9, 2021

(65) Prior Publication Data

US 2022/0176945 A1  Jun. 9, 2022

(30) Foreign Application Priority Data

Dec. 9, 2020 (JP) .............................. JP2020-204422

(51) Int. Cl.
*B60W 30/06* (2006.01)
*G05D 1/02* (2020.01)

(52) U.S. Cl.
CPC ........... *B60W 30/06* (2013.01); *G05D 1/0212* (2013.01); *G05D 1/0234* (2013.01); *B60W 2552/53* (2020.02); *G05D 2201/0213* (2013.01)

(58) Field of Classification Search
CPC ............. B60W 30/06; B60W 2552/53; G05D 1/0212; G05D 1/0234; G05D 2201/0213; G05D 1/0297; B62D 15/0285; G08G 1/14
See application file for complete search history.

(56) References Cited

U.S. PATENT DOCUMENTS

| 2017/0032356 A1 | 2/2017 | Nordbruch et al. |
| 2020/0269835 A1* | 8/2020 | Hara ..................... B60W 30/06 |

FOREIGN PATENT DOCUMENTS

| JP | 2018500668 A | 1/2018 |
| JP | 6342076 B2 | 6/2018 |
| JP | 2018515828 A | 6/2018 |
| JP | 2019087112 A | 6/2019 |
| JP | 2020138612 A | 9/2020 |

* cited by examiner

*Primary Examiner* — Daryl C Pope
(74) *Attorney, Agent, or Firm* — Dinsmore & Shohl LLP

(57) ABSTRACT

A vehicle adapted to an automated valet parking service in a parking lot includes a recognition sensor that recognizes a mark around the vehicle. The vehicle performs a self-position estimation process for identifying a vehicle position in the parking lot based on an installation position and a recognition result of the mark by the recognition sensor. The vehicle performs vehicle traveling control for causing the vehicle to automatically travel in the parking lot based on the vehicle position. The automated valet parking service includes an additional service implemented on the vehicle during a period in which the vehicle is left in the parking lot. When restarting the vehicle traveling control after completion of the additional service, the vehicle executes the self-position estimation process in a return space where the mark is installed to acquire a latest vehicle position, and restarts the vehicle traveling control based on the latest vehicle position.

4 Claims, 7 Drawing Sheets

VEHICLE AND VEHICLE CONTROL METHOD

CROSS-REFERENCE TO RELATED APPLICATION

This application claims priority to Japanese Patent Application No. 2020-204422 filed on Dec. 9, 2020, incorporated herein by reference in its entirety.

BACKGROUND

1. Technical Field

The present disclosure relates to a vehicle adapted to an automated valet parking (AVP) service in a parking lot, and a method of controlling the vehicle.

2. Description of Related Art

Japanese Patent No. 6342076 (JP 6342076 B) discloses, as a technique related to automated valet parking services in a parking lot, providing additional services such as cleaning, refueling, inspection, repair, tire replacement, and the like, to vehicles parked in a parking lot.
Japanese Unexamined Patent Application Publication (Translation of PCT Application) No. 2018-515828 (JP 2018-515828 A) discloses a technique for updating software stored in a processing device of a vehicle while the vehicle is parked in a parking lot.

SUMMARY

Automated valet parking services in parking lots are known. A vehicle adapted to the automated valet parking service has a self-position estimation (localization) function, and executes vehicle traveling control while specifying its own vehicle position in the parking lot. When the parking to the parking space in the parking lot is completed, the vehicle terminates the vehicle traveling control and stores the final stop position. At the time of exit from the parking lot, the vehicle reads the stored final stop position as the latest own vehicle position and restarts the vehicle traveling control.

As a part of the automated valet parking service in parking lots, additional services such as car washing, inspection, and repair have been proposed. Such additional services are implemented on the vehicle during the period in which the vehicle is left in the parking lot. However, when the additional service is implemented on the vehicle, there is a possibility that the vehicle position deviates from the final stop position. For example, with jack-up, the vehicle position deviates from the final stop position. When the vehicle position deviates from the stored final stop position, it is not appropriate to restart the vehicle traveling control using the stored final stop position after completion of the additional service. This is because the accuracy of the vehicle traveling control is lowered.

One object of the present disclosure is to provide a technique capable of restarting the vehicle traveling control appropriately even after completion of the additional service for a vehicle adapted to the automated valet parking service in the parking lot.

A first aspect relates to a vehicle adapted to an automated valet parking service in a parking lot. The vehicle includes: a recognition sensor that recognizes a mark around the vehicle; and a processor. The processor is configured to execute: a self-position estimation process for identifying a vehicle position that is a position of the vehicle in the parking lot based on an installation position of the mark and a recognition result of the mark by the recognition sensor; and vehicle traveling control for causing the vehicle to automatically travel in the parking lot based on the vehicle position. The automated valet parking service includes an additional service implemented on the vehicle during a period in which the vehicle is left in the parking lot. When restarting the vehicle traveling control after completion of the additional service, the processor executes the self-position estimation process in a return space in which the mark is installed to acquire a latest vehicle position, and restarts the vehicle traveling control based on the latest vehicle position.

A second aspect has the following features in addition to the first aspect. The processor stores, in a storage device, a final stop position that is the vehicle position at an end of the vehicle traveling control. When restarting the vehicle traveling control after the completion of the additional service, the processor executes the self-position estimation process in the return space to acquire the latest vehicle position, without using the final stop position stored in the storage device.

A third aspect has the following features in addition to the second aspect. When restarting the vehicle traveling control at a time the vehicle exits from the parking lot, the processor acquires the final stop position stored in the storage device as the latest vehicle position and restarts the vehicle traveling control based on the latest vehicle position.

A fourth aspect relates to a vehicle control method for controlling a vehicle adapted to an automated valet parking service in a parking lot. The vehicle control method includes: a process of recognizing a mark around the vehicle using a recognition sensor mounted on the vehicle; a self-position estimation process for identifying a vehicle position that is a position of the vehicle in the parking lot based on an installation position of the mark and a recognition result of the mark by the recognition sensor; and vehicle traveling control for causing the vehicle to automatically travel in the parking lot based on the vehicle position. The automated valet parking service includes an additional service implemented on the vehicle during a period in which the vehicle is left in the parking lot. The vehicle control method further includes a first restart process for restarting the vehicle traveling control after completion of the additional service. The first restart process executes the self-position estimation process in a return space in which the mark is installed to acquire a latest vehicle position, and restarts the vehicle traveling control based on the latest vehicle position.

A fifth aspect has the following features in addition to the fourth aspect. The vehicle control method further includes a process of storing, in a storage device, a final stop position that is the vehicle position at an end of the vehicle traveling control. The first restart process executes the self-position estimation process in the return space to acquire the latest vehicle position, without using the final stop position stored in the storage device.

A sixth aspect has the following features in addition to the fifth aspect. The vehicle control method further includes a second restart process for restarting the vehicle traveling control at a time the vehicle exits from the parking lot. The second restart process acquires the final stop position stored in the storage device as the latest vehicle position, and restarts the vehicle traveling control based on the latest vehicle position.

According to the present disclosure, when restarting the vehicle traveling control after completion of the additional service, the self-position estimation process is executed in the return space where the mark is installed. Thus, even when the vehicle position deviates during the additional service, the latest vehicle position can be obtained with high accuracy. Therefore, it is possible to appropriately restart the vehicle traveling control.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described with reference to the accompanying drawings.

1. Overview of Automated Valet Parking System

Figure 1:
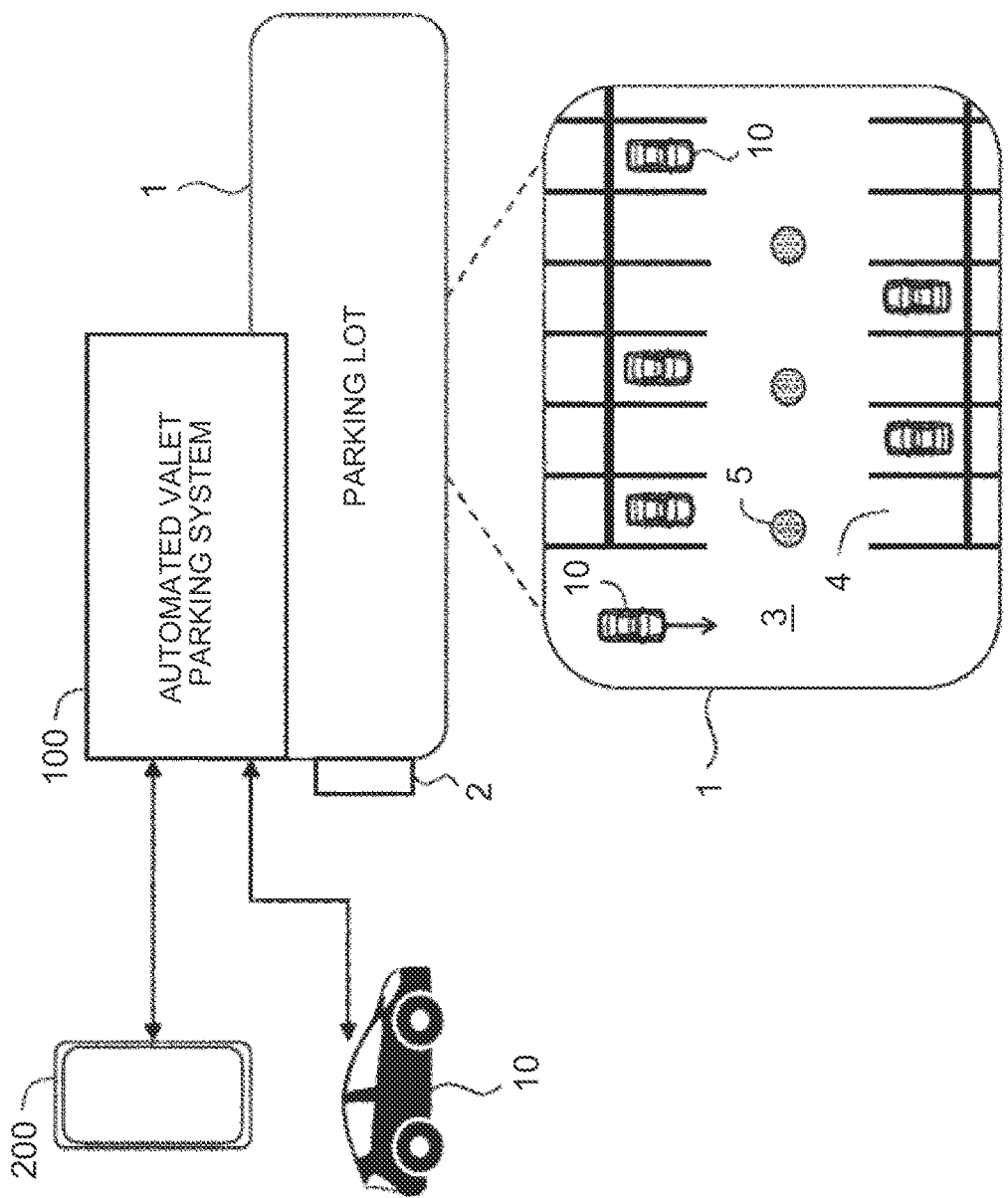
FIG. 1 is a conceptual diagram illustrating an overview of an automated valet parking system according to an embodiment of the present disclosure.

FIG. 1 is a conceptual diagram illustrating an overview of an automated valet parking system 100 according to the present embodiment. The automated valet parking system 100 controls and provides an automated valet parking (AVP) service in a parking lot 1.

A vehicle adapted to the automated valet parking service is hereinafter referred to as "AVP vehicle 10". The AVP vehicle 10 is capable of communicating with the automated valet parking system 100. Further, the AVP vehicle 10 can travel without depending on the driving operation by the driver at least in the parking lot 1. The AVP vehicle 10 may be an autonomous driving vehicle.

The parking lot 1 is used by at least the AVP vehicle 10. The parking lot 1 may be used for parking general vehicles other than the AVP vehicle 10.

The parking lot 1 includes a boarding and alighting area 2, a passage 3, and a plurality of parking spaces 4. The AVP vehicle 10 that is parked in the parking lot 1 or the AVP vehicle 10 that exits from the parking lot 1 stops in the boarding and alighting area 2. An occupant gets off the AVP vehicle 10 or gets on the AVP vehicle 10 in the boarding and alighting area 2. The passage 3 is an area where vehicles such as the AVP vehicle 10 and general vehicles travel. The parking space 4 is a space in which the AVP vehicle 10 and general vehicles are parked. For example, the parking spaces 4 are separated by marking lines.

Marks (Landmarks) 5 may be disposed at predetermined positions in the parking lot 1. The marks 5 are used to guide the AVP vehicle 10 in the parking lot 1. Examples of the marks 5 include markers, columns, and the like. Typically, a plurality of marks 5 are distributed in the parking lot 1.

Hereinafter, an example of a flow when a certain user X uses the automated valet parking service will be described. Member information of the user X is assumed to be registered in advance in the automated valet parking system 100. A vehicle registration number of the AVP vehicle 10 used by the user X (the number described in the license plate) may be registered in advance in the automated valet parking system 100, together with the member information of the user X.

A terminal device 200 is a terminal device operated by the user X. Typically, the terminal device 200 is owned by the user X. Examples of the terminal device 200 include a smartphone, a tablet, a personal computer, a human-machine interface (HMI) mounted on the AVP vehicle 10, and the like. The terminal device 200 is capable of communicating with the automated valet parking system 100.

First, the user X makes reservations for automated valet parking. For example, the user X operates the terminal device 200 and inputs the identification (ID) information of the user X, the desired parking lot 1, the desired use date, the desired use time (desired entry time and desired exit time), and the like. The user X may input the vehicle registration number of the AVP vehicle 10. The terminal device 200 transmits reservation information including the input information to the automated valet parking system 100. The automated valet parking system 100 performs a reservation process based on the reservation information, and transmits the reservation completion notification to the terminal device 200. Further, the automated valet parking system 100 transmits the authentication information corresponding to the reservation information to the terminal device 200. The terminal device 200 receives the authentication information and keeps the received authentication information.

Entry of the AVP vehicle 10 to the parking lot 1 is performed as follows. The AVP vehicle 10 carrying the user X arrives at and stops at the boarding and alighting area 2 of the parking lot 1. In the boarding and alighting area 2, the user X (and possibly other occupants) gets off the AVP vehicle 10. Then, the user X requests the entry of the AVP vehicle 10 using the authentication information kept in the terminal device 200. For example, the user X transmits the authentication information from the terminal device 200 to the automated valet parking system 100. Alternatively, the user X may cause a reader installed in the boarding and alighting area 2 to read the authentication information (e.g., QR code (registered trademark)).

In response to the entry request, the automated valet parking system 100 authenticates the user X. For example, the automated valet parking system 100 authenticates the user X by matching the authentication information with the reservation information. The automated valet parking system 100 may also read the vehicle registration number described in the license plate of the AVP vehicle 10 using a camera installed in the boarding and alighting area 2. Then, the automated valet parking system 100 may authenticate the AVP vehicle 10 by matching the read vehicle registration number with the vehicle registration number registered in advance or included in the reservation information.

Upon completion of the authentication, the operating authority of the AVP vehicle 10 shifts from the user X to the automated valet parking system 100. The automated valet parking system 100 performs entry process related to the AVP vehicle 10.

In the entry process, the automated valet parking system 100 communicates with the AVP vehicle 10 to activate the AVP vehicle 10 (ignition ON).

Further, the automated valet parking system 100 assigns an unoccupied parking space 4 to the AVP vehicle 10 by referring to the use status of the parking lot 1. Then, the automated valet parking system 100 communicates with the AVP vehicle 10 to provide entry guidance information to the AVP vehicle 10. The entry guidance information includes information of the assigned parking space 4 and the map information of the parking lot 1. The automated valet parking system 100 may specify a traveling route from the boarding and alighting area 2 to the assigned parking space 4. In that case, the entry guidance information includes information of the specified traveling route.

Thereafter, the automated valet parking system 100 communicates with the AVP vehicle 10 to permit entry.

Upon receipt of the entry permission, the AVP vehicle 10 starts the vehicle traveling control. Specifically, the AVP vehicle 10 automatically travels along the passage 3 from the boarding and alighting area 2 to the assigned parking space 4, and is automatically parked in the assigned parking space 4, based on the entry guidance information. At this time, the AVP vehicle 10 may travel along the traveling route specified by the automated valet parking system 100. The automated valet parking system 100 may communicate with the AVP vehicle 10 and remotely control the travel of the AVP vehicle 10.

Upon completion of parking, the AVP vehicle 10 notifies the automated valet parking system 100 of the completion of parking. Alternatively, the automated valet parking system 100 may detect that the parking of the AVP vehicle 10 is completed using an infrastructure sensor installed in the parking lot 1. After parking is completed, the automated valet parking system 100 communicates with the AVP vehicle 10 to stop the operation of the AVP vehicle 10 (ignition OFF). The automated valet parking system 100 keeps the information of the parking space 4 of the AVP vehicle 10 in association with the user X.

Exit of the AVP vehicle 10 from the parking lot 1 is performed as follows. The user X requests the exit of the AVP vehicle 10 using the terminal device 200. The exit request includes the authentication information, information of the boarding and alighting area 2 specified by the user X, and the like. In response to the exit request, the automated valet parking system 100 authenticates the user X and performs the exit process related to the AVP vehicle 10.

In the exit process, the automated valet parking system 100 communicates with the AVP vehicle 10 to activate the AVP vehicle 10 (ignition ON).

The automated valet parking system 100 also communicates with the AVP vehicle 10 to provide exit guidance information to the AVP vehicle 10. The exit guidance information includes information of the boarding and alighting area 2 specified by the user X and the map information of the parking lot 1. The automated valet parking system 100 may specify a traveling route from the parking space 4 to the specified boarding and alighting area 2. In that case, the exit guidance information includes the information of the specified traveling route.

Thereafter, the automated valet parking system 100 communicates with the AVP vehicle 10 and permits the exit.

Upon receipt of the exit permission, the AVP vehicle 10 starts the vehicle traveling control. Specifically, the AVP vehicle 10 automatically travels along the passage 3 from the parking space 4 to the specified boarding and alighting area 2 based on the exit guidance information. At this time, the AVP vehicle 10 may travel along the traveling route specified by the automated valet parking system 100. The automated valet parking system 100 may communicate with the AVP vehicle 10 and remotely control the travel of the AVP vehicle 10.

The AVP vehicle 10 arrives at and stops at the boarding and alighting area 2 specified by the user X. The operating authority of the AVP vehicle 10 shifts from the automated valet parking system 100 to the user X. The user X (and possibly other occupants) gets on the AVP vehicle 10. The AVP vehicle 10 departs toward the next destination.

2. AVP Vehicle 2-1. Configuration Example

Figure 2:
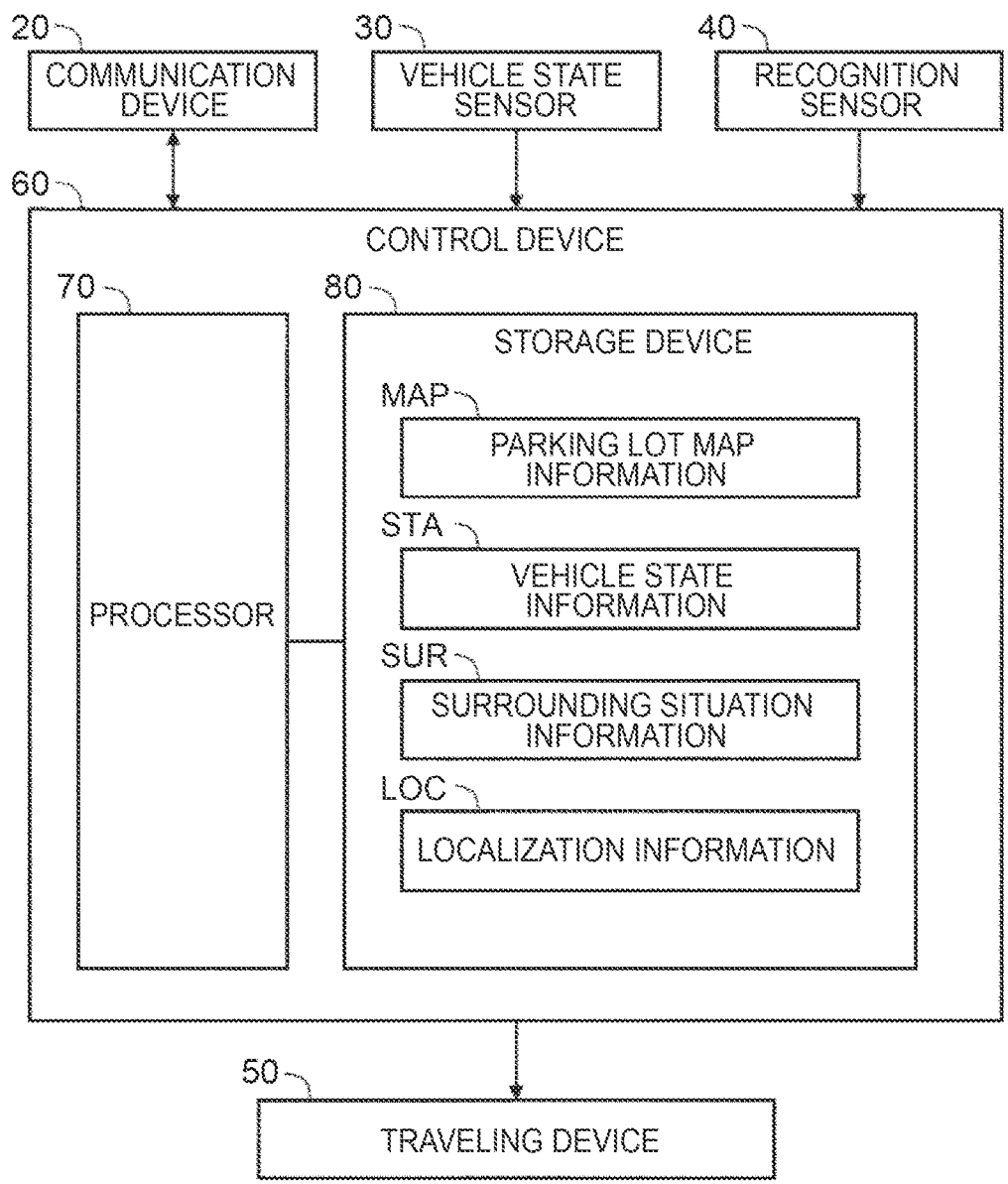
FIG. 2 is a block diagram showing a configuration example of an automated valet parking (AVP) vehicle according to the embodiment of the present disclosure.

FIG. 2 is a block diagram showing a configuration example of the AVP vehicle 10 according to the present embodiment. The AVP vehicle 10 includes a communication device 20, a vehicle state sensor 30, a recognition sensor 40, a traveling device 50, and a control device 60.

The communication device 20 communicates with the outside of the AVP vehicle 10. For example, the communication device 20 communicates with the automated valet parking system 100.

The vehicle state sensor 30 detects the state of the AVP vehicle 10. Examples of the vehicle state sensor 30 include a vehicle speed sensor, a steering angle sensor, a yaw rate sensor, a lateral acceleration sensor, and the like.

The recognition sensor 40 recognizes (detects) the situation around the AVP vehicle 10. Examples of the recognition sensor 40 include a camera, a laser imaging detection and ranging (LIDAR), a radar, a sonar, and the like.

The traveling device 50 includes a steering device, a driving device, and a braking device. The steering device steers the wheels of the AVP vehicle 10. For example, the steering device includes a power steering (an electric power steering (EPS)) system. The driving device is a power source that generates driving power. Examples of the driving device include an engine, an electric motor, an in-wheel motor, and the like. The braking device generates braking power.

The control device 60 controls the AVP vehicle 10. The control device 60 is also referred to as an electronic control unit (ECU). The control device 60 includes one or more processors 70 and one or more storage devices 80. The processor 70 executes various processes. Various types of information are stored in the storage device 80. Examples of the storage device 80 include a volatile memory, a non-volatile memory, a hard disk drive (HDD), a solid state drive (SSD), and the like. When the one or more processors 70 execute a control program that is a computer program, various processes executed by the control device 60 are realized. The control program is stored in the storage device 80 or recorded on a computer-readable storage medium.

2-2. Information Acquisition Process

The processor 70 (control device 60) executes an information acquisition process for acquiring various types of information. The various types of information include parking lot map information MAP, vehicle state information STA, surrounding situation information SUR, localization information LOC, and the like. The acquired information is stored in the storage device 80.

The parking lot map information MAP is the map information of the parking lot 1. Specifically, the parking lot map information MAP indicates the boarding and alighting area 2, the passage 3, the parking spaces 4, and the arrangement of the marks 5 in the parking lot 1. For example, the marks 5 are installed at predetermined positions in the parking lot 1. The parking lot map information MAP indicates the predetermined positions of the marks 5. The parking lot map information MAP is provided by the automated valet parking system 100. The processor 70 acquires the parking lot map information MAP from the automated valet parking system 100 via the communication device 20.

The vehicle state information STA is information indicating the state of the AVP vehicle 10, and indicates the detection result by the vehicle state sensor 30. Examples of the state of the AVP vehicle 10 include a vehicle speed, a steering angle (turned angles of the wheels), a yaw rate, a lateral acceleration, and the like. The processor 70 acquires the vehicle state information STA from the vehicle state sensor 30.

The surrounding situation information SUR is information indicating the situation around the AVP vehicle 10, and indicates the recognition result by the recognition sensor 40. For example, the surrounding situation information SUR includes image information that is captured by the camera. As another example, the surrounding situation information SUR includes measurement information indicating the measurement result by the radar or the LIDAR. In addition, the surrounding situation information SUR includes information (e.g., location, relative velocity) related to objects around the AVP vehicle 10. Examples of the objects around the AVP vehicle 10 include the passage 3, the parking spaces 4, the marks 5, white lines, other vehicles, structures (e.g., walls and columns), and the like. Based on at least one of the image information and the measurement information described above, it is possible to recognize an object around the AVP vehicle 10, and also to calculate the relative position and the relative speed of the recognized object. Furthermore, by combining the relative position of the object and the vehicle position to be described later, it is possible to calculate the position (absolute position) of the object in the parking lot 1. Thus, the processor 70 can acquire (generate) the surrounding situation information SUR based on the recognition result by the recognition sensor 40.

Further, the processor 70 (control device 60) executes a "self-position estimation process (localization)" for identifying the position and orientation of the AVP vehicle 10 in the parking lot 1. The position and orientation of the AVP vehicle 10 in the parking lot 1 is hereinafter referred to as "vehicle position". The processor 70 identifies the vehicle position using the recognition result of the mark 5 by the recognition sensor 40, that is, the surrounding situation information SUR described above. More specifically, the processor 70 calculates the movement amount of the AVP vehicle 10 based on the vehicle state information STA (vehicle speed, steering angle), thereby roughly calculating the vehicle position. Furthermore, the processor 70 corrects the vehicle position by matching the installation position of the mark 5 indicated by the parking lot map information MAP with the recognition position of the mark 5 indicated by the surrounding situation information SUR. Thereby, the vehicle position can be identified (estimated) with high accuracy. By repeating the calculation of the movement amount and the correction of the vehicle position, it is possible to continuously obtain a highly accurate vehicle position.

The localization information LOC indicates the vehicle position identified by the self-position estimation process. As described above, the self-position estimation process is executed based on the surrounding situation information SUR, that is, the recognition result by the recognition sensor 40. That is, the localization information LOC is generated based on the recognition result by the recognition sensor 40, similarly to the surrounding situation information SUR.

2-3. Communication Process

The processor 70 (control device 60) communicates with the automated valet parking system 100 via the communication device 20. For example, the processor 70 receives the entry guidance information and exit guidance information described above from the automated valet parking system 100. Further, the processor 70 periodically transmits the vehicle state information STA and the localization information LOC described above to the automated valet parking system 100.

2-4. Vehicle Traveling Control

The processor 70 (control device 60) executes "vehicle traveling control" that controls the travel of the AVP vehicle 10 without depending on the driving operation of the driver. The vehicle traveling control includes steering control, acceleration control, and deceleration control. The processor 70 executes the vehicle traveling control by controlling the traveling device 50. Specifically, the processor 70 executes the steering control by controlling the steering device. Further, the processor 70 executes the acceleration control by controlling the driving device. Furthermore, the processor 70 executes the deceleration control by controlling the braking device.

In the parking lot 1, the processor 70 executes the vehicle traveling control to cause the AVP vehicle 10 to travel autonomously. Specifically, the processor 70 grasps the map of the parking lot 1 and the vehicle position in the parking lot 1 based on the parking lot map information MAP and the localization information LOC. For example, the processor 70 executes the vehicle traveling control so that the AVP vehicle 10 automatically travels toward the destination.

For example, in the case of the entry process described above, the departure point is the boarding and alighting area 2, and the destination is the assigned parking space 4. The processor 70 executes the vehicle traveling control so that the AVP vehicle 10 automatically travels from the boarding and alighting area 2 to the assigned parking space 4 and is automatically parked in the assigned parking space 4. The position of the assigned parking space 4 is acquired from the parking lot map information MAP. The processor 70 may execute the vehicle traveling control so that the AVP vehicle 10 travels along a traveling route specified by the automated valet parking system 100. When parking the AVP vehicle 10 in the parking space 4, it is also possible to grasp the parking situation of the parking space 4 and the surroundings by referring to the surrounding situation information SUR. The vehicle traveling control may be executed to avoid collision with other vehicles or structures by referring to the surrounding situation information SUR.

The same applies to the exit process. In the case of the exit process, the departure point is the assigned parking space 4, and the destination is the boarding and alighting area 2. The processor 70 executes the vehicle traveling control so that the AVP vehicle 10 automatically travels from the parking space 4 to the boarding and alighting area 2 and automatically stops in the boarding and alighting area 2.

3. Additional Service

It is also conceivable that the "additional services" other than the parking service are provided to the AVP vehicle 10 by effectively utilizing the period during which the AVP vehicle 10 is left in the parking lot 1 (i.e., the period during which the occupant is not on the AVP vehicle 10). Examples of the additional services include car washing, inspection, repair, refueling, charging, tire replacement, and the like of the AVP vehicle 10. Such additional services are part of the automated valet parking service.

Figure 3:
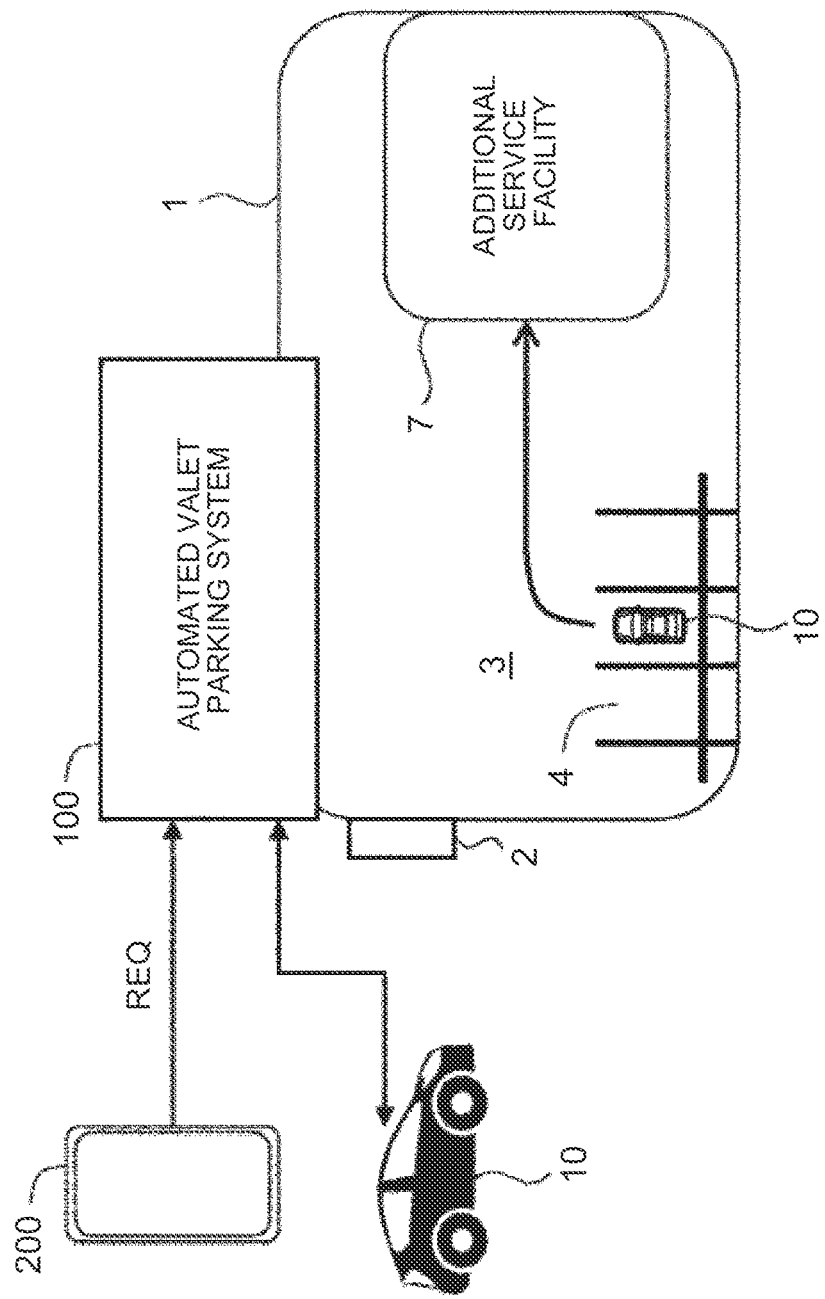
FIG. 3 is a conceptual diagram illustrating an additional service according to the embodiment of the present disclosure.

FIG. 3 is a conceptual diagram illustrating the additional service according to the present embodiment. An additional service facility 7 is a facility for implementing the additional service on the AVP vehicle 10. The additional service facility 7 is provided in the parking lot 1 or is attached to the parking lot 1.

The user X of the AVP vehicle 10 considers using additional service information ASV during the period in which the AVP vehicle 10 is left in the parking lot 1. The automated valet parking system 100 may transmit information that proposes the additional service to the terminal device 200. When it is determined that the additional service is to be used, the user X operates the terminal device 200 to send an additional service request REQ to the automated valet parking system 100. The additional service request REQ is information requesting the use of the additional service.

Figure 4:
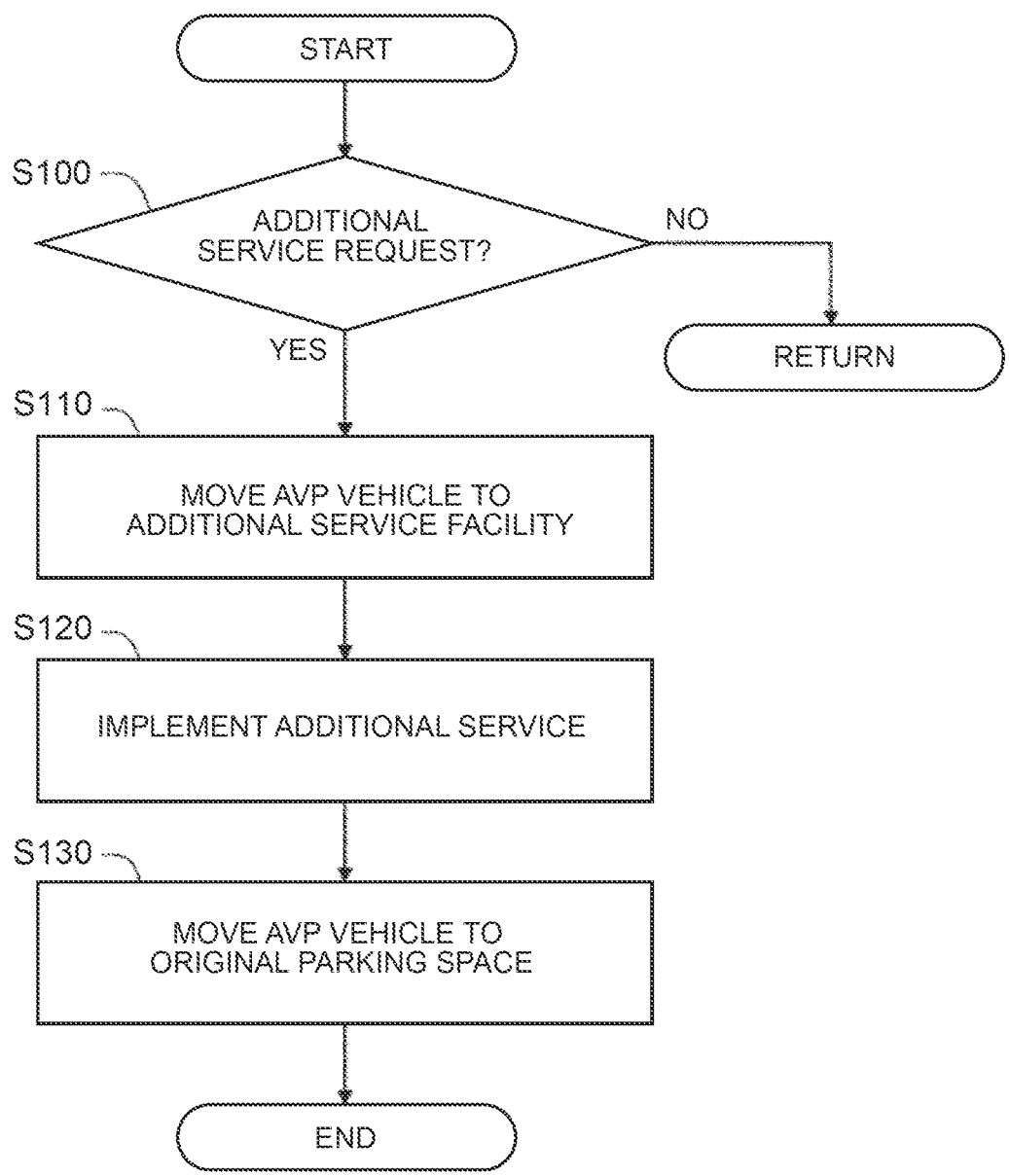
FIG. 4 is a flowchart showing a process related to the additional service according to the embodiment of the present disclosure.

FIG. 4 is a flowchart showing a process related to the additional service according to the present embodiment.

In step S100, the automated valet parking system 100 determines whether the additional service request REQ has been received from the terminal device 200. When the automated valet parking system 100 receives the additional service request REQ (step S100; Yes), the process proceeds to step S110.

In step S110, the automated valet parking system 100 performs a movement process of moving the AVP vehicle 10 to the additional service facility 7 (see FIG. 3). This movement process is performed in the same manner as the entry process and the exit process. The departure point is the parking space 4 where the AVP vehicle 10 is parked, and the destination is the additional service facility 7. The automated valet parking system 100 specifies a destination and instructs the AVP vehicle 10 to move to that destination. The AVP vehicle 10 (processor 70) executes the vehicle traveling control so that the AVP vehicle 10 automatically travels from the parking space 4 to the additional service facility 7. Then, the process proceeds to step S120.

In step S120, the automated valet parking system 100 instructs the operator to implement the additional service. The operator implements the additional service on the AVP vehicle 10. Upon completion of the additional service, the operator notifies the automated valet parking system 100 of the completion of the additional service. Then, the process proceeds to step S130.

In step S130, the automated valet parking system 100 performs a movement process of moving the AVP vehicle 10 to the original parking space 4. This movement process is performed in the same manner as the entry process and the exit process. The departure point is the additional service facility 7, and the destination is the original parking space 4. The automated valet parking system 100 specifies a destination and instructs the AVP vehicle 10 to move to that destination. The AVP vehicle 10 (processor 70) executes the vehicle traveling control so that the AVP vehicle 10 automatically travels from the additional service facility 7 to the parking space 4 and is automatically parked in the parking space 4. The automated valet parking system 100 may transmit information indicating completion of the additional service to the terminal device 200.

When the automated valet parking service includes the additional service, the convenience and usefulness of the automated valet parking service is further improved.

4. Restart Process

As described above, the processor 70 of the AVP vehicle 10 performs the vehicle traveling control while specifying the vehicle position by performing the self-position estimation process. Upon completion of parking to the assigned parking space 4, the processor 70 terminates the vehicle traveling control and stores the localization information LOC at the end of the vehicle traveling control in the storage device 80. The vehicle position indicated by the localization information LOC at the end of the vehicle traveling control is referred to as the "final stop position" for convenience.

It is necessary to restart the vehicle traveling control at the time of exit from the parking lot 1. This process is hereinafter referred to as "restart process". In the normal restart process, the processor 70 reads the localization information LOC stored in the storage device 80 and acquires the final stop position indicated by the localization information LOC as the latest vehicle position. Then, the processor 70 restarts the vehicle traveling control based on the latest vehicle position.

Next, the case where the additional service described above is implemented on the AVP vehicle 10 is considered. When the additional service is implemented on the AVP vehicle 10, the vehicle position may deviate from the final stop position. For example, with jack-up, the vehicle position deviates from the final stop position. When the vehicle position deviates from the stored final stop position, it is not appropriate to restart the vehicle traveling control using the stored final stop position after completion of the additional service. This is because the accuracy of the vehicle traveling control is lowered.

Therefore, according to the present embodiment, when restarting the vehicle traveling control after completion of the additional service, a method different from the normal restart process is used.

Figure 5:
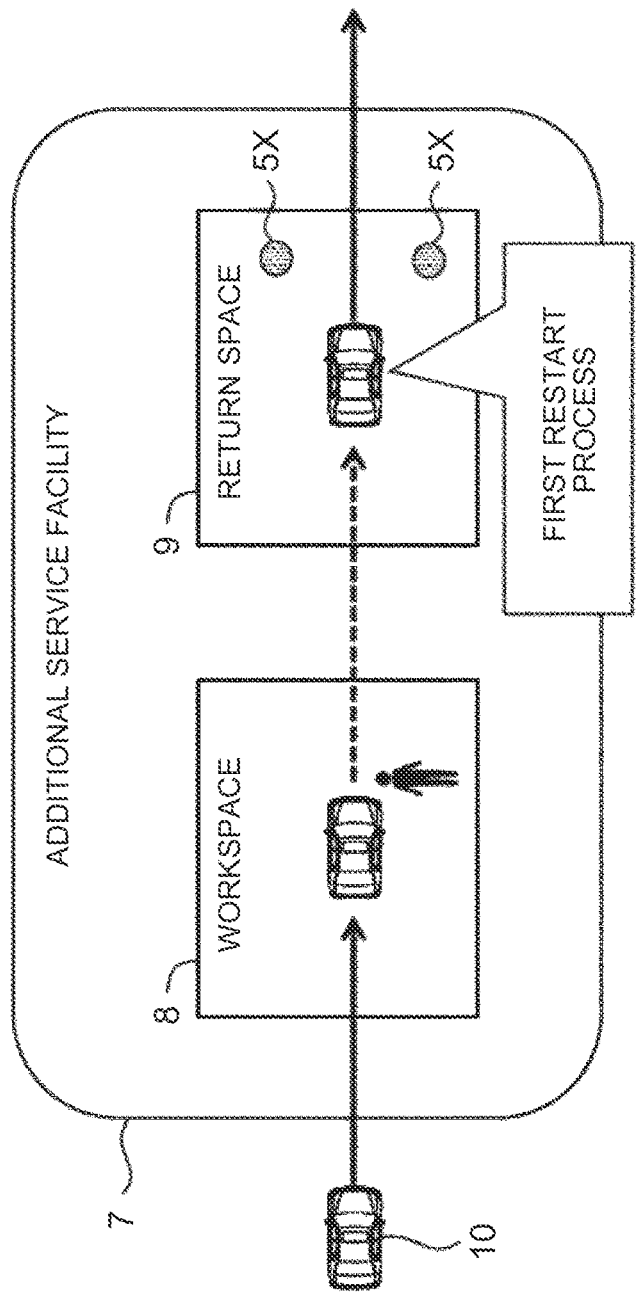
FIG. 5 is a conceptual diagram illustrating restart of vehicle traveling control after completion of the additional service according to the embodiment of the present disclosure.

FIG. 5 is a conceptual diagram illustrating the restart of the vehicle traveling control after completion of the additional service. The additional service facility 7 includes a workspace 8 and a return space 9. When the additional service is implemented, the AVP vehicle 10 is located in the workspace 8. The operator implements the additional service on the AVP vehicle 10 located in the workspace 8. Upon completion of the additional service, the operator moves the AVP vehicle 10 to a predetermined return space 9. Then, the operator notifies the automated valet parking system 100 of completion of the additional service.

Marks 5X similar to the marks 5 in the parking lot 1 are installed in the return space 9. The installation positions of the marks 5X are included in the parking lot map information MAP. The processor 70 can execute the self-position estimation process using the marks 5X installed in the return space 9 to acquire the latest vehicle position.

More particularly, the processor 70 acquires a "reference vehicle position", which is a rough vehicle position. The reference vehicle position is, for example, a position of the return space 9. As another example, the reference vehicle position may be the position of the AVP vehicle 10 calculated from the imaging result by an infrastructure camera. Such a reference vehicle position is notified from the automated valet parking system 100 to the processor 70. Further, the processor 70 recognizes the marks 5X using the recognition sensor 40. Then, the processor 70 corrects the vehicle position by matching the installation position of the marks 5X indicated by the parking lot map information MAP and the recognition position of the marks 5X recognized by the recognition sensor 40.

Thus, by using the marks 5X installed in the return space 9, even after completion of the additional service, it is possible to acquire the latest vehicle position with high accuracy. The processor 70 restarts the vehicle traveling control based on the acquired latest vehicle position. The restart process after completion of the additional service is referred to as the "first restart process" hereinafter.

Figure 6:
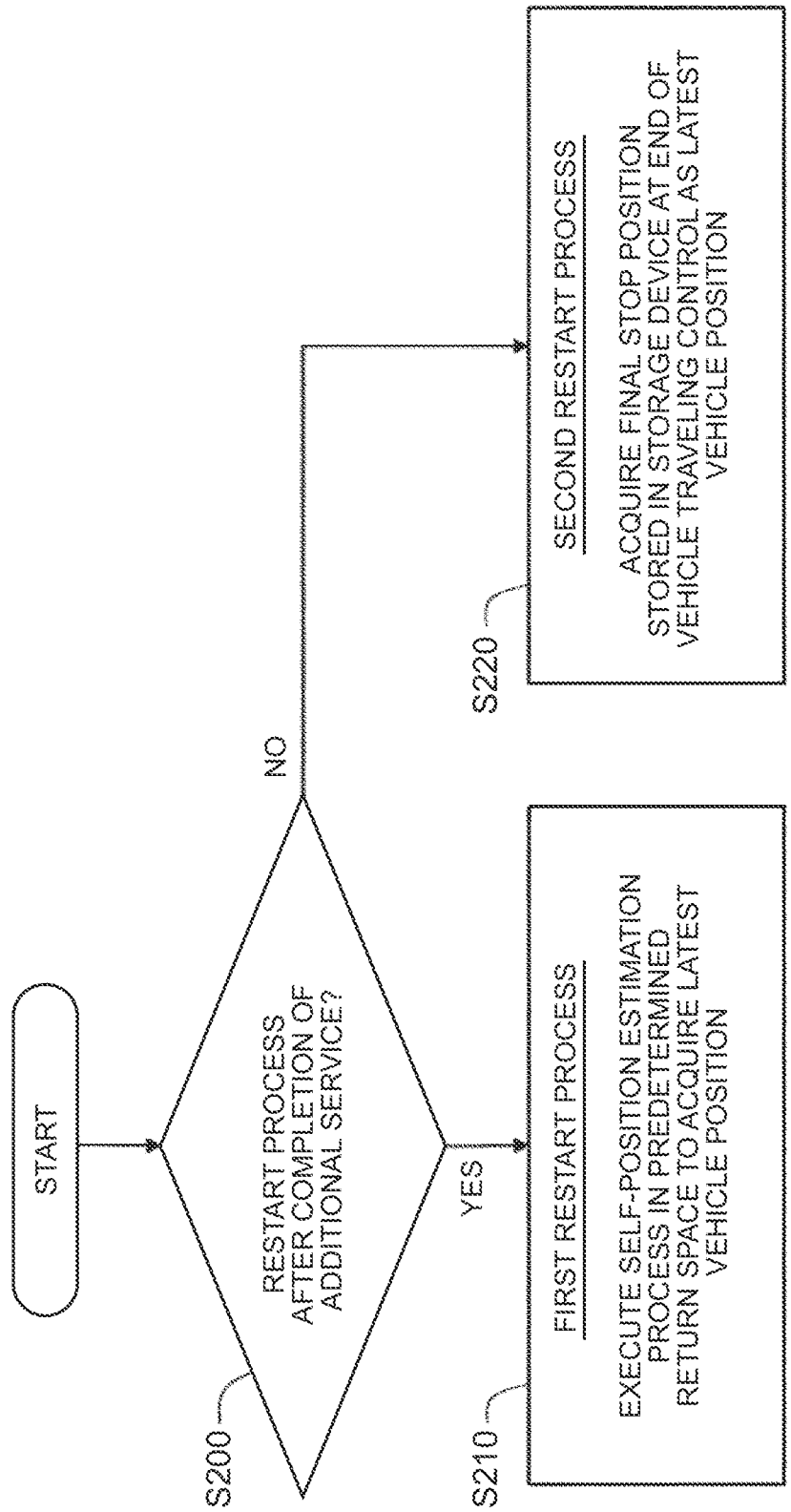
FIG. 6 is a flowchart showing a restart process for restarting the vehicle traveling control of the AVP vehicle according to the embodiment of the present disclosure.

FIG. 6 is a flowchart showing the restart process according to the present embodiment. When it is a restart process after completion of the additional service (step S200; Yes), the first restart process is performed (step S210). In other cases (step S200; No), the second restart process (the normal restart process) is performed (step S220).

In the first restart process, the processor 70 executes the self-position estimation process in a predetermined return space 9 where the marks 5X are installed. Specifically, the processor 70 recognizes the marks 5X using the recognition sensor 40, and executes the self-position estimation process based on the recognition result of the marks 5X to acquire the latest vehicle position. Note that in this first restart process, the final stop position stored in the storage device 80 is not used. That is, the processor 70 executes the self-position estimation process to acquire the latest vehicle position without using the final stop position stored in the storage device 80. Then, the processor 70 restarts the vehicle traveling control based on the acquired latest vehicle position.

In the second restart process (normal restart process), the processor 70 reads the localization information LOC stored in the storage device 80 and acquires the final stop position indicated by the localization information LOC as the latest vehicle position. Then, the processor 70 restarts the vehicle traveling control based on the acquired latest vehicle position.

As described above, according to the present embodiment, when restarting the vehicle traveling control after completion of the additional service, the self-position estimation process is executed in the return space 9 where the marks 5X are installed. Thus, even when the vehicle position deviates during the additional service, the latest vehicle position can be obtained with high accuracy. Therefore, it is possible to appropriately restart the vehicle traveling control.

5. Example of Automated Valet Parking System

Figure 7:
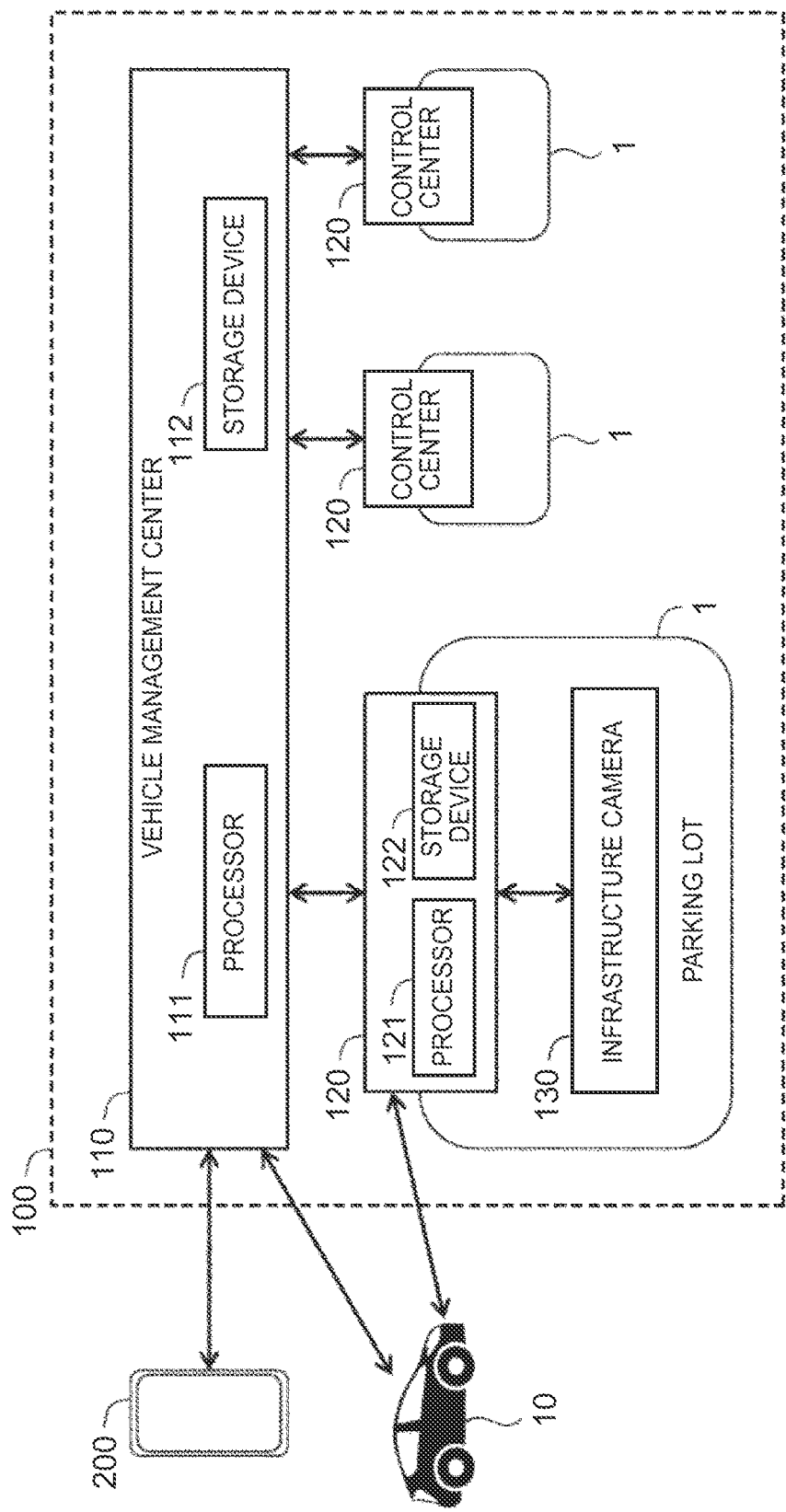
FIG. 7 is a schematic diagram showing a configuration example of the automated valet parking system according to the embodiment of the present disclosure.

FIG. 7 is a schematic diagram showing a configuration example of the automated valet parking system 100 according to the present embodiment. The automated valet parking system 100 includes a vehicle management center 110, a control center 120, and an infrastructure camera 130. The control center 120 is installed for each parking lot 1. Thus, the number of the control centers 120 is same as that of the parking lots 1. The vehicle management center 110 oversees all control centers 120. The infrastructure camera 130 is installed in the parking lot 1 and recognizes the situation in the parking lot 1. For example, the infrastructure camera 130 capture images of the AVP vehicle 10 in the parking lot 1.

The vehicle management center 110 includes an information processing device (vehicle management server). The information processing device includes a processor 111 and a storage device 112. Various types of information are stored in the storage device 112. Examples of the storage device 112 include a volatile memory, a non-volatile memory, an HDD, an SSD, and the like. The processor 111 executes various kinds of processing by executing the computer program stored in the storage device 112. Further, the processor 111 communicates with the control center 120, the AVP vehicle 10, and the terminal device 200.

The control center 120 includes an information processing device (control device). The information processing device includes a processor 121 and a storage device 122. Various types of information are stored in the storage device 122. Examples of the storage device 122 include a volatile memory, a non-volatile memory, an HDD, an SSD, and the like. The processor 121 executes various kinds of processing by executing the computer program stored in the storage device 122. Further, the processor 121 communicates with the vehicle management center 110, the AVP vehicle 10, and the infrastructure camera 130.

Processing by the automated valet parking system 100 according to the present embodiment is executed by at least one of the processor 111 of the vehicle management center 110 and the processor 121 of the control center 120. That is, processing by the automated valet parking system 100 according to the present embodiment is executed by one or more processors (111, 121). Further, information necessary for processing is stored in at least one of the storage device 112 of the vehicle management center 110 and the storage device 122 of the control center 120. That is, the information necessary for processing is stored in one or more storage devices (112, 122).

For example, one or more processors (111, 121) of the automated valet parking system 100 execute processing associated with the additional service shown in FIG. 4.

In step S100, the processor 111 of the vehicle management center 110 receives the additional service request REQ from the terminal device 200. In response to the additional service request REQ, the process proceeds to step S110.

In step S110, the processor 111 of the vehicle management center 110 communicates with the AVP vehicle 10 to activate the AVP vehicle 10 (ignition ON). Further, the processor 111 communicates with the control center 120 and instructs the control center 120 to execute the movement process. The processor 121 of the control center 120 transmits the movement process instruction information to the AVP vehicle 10. The movement process instruction information indicates the additional service facility 7 that is the destination. In response to the movement process instruction information, the AVP vehicle 10 automatically travels from the parking space 4 to the additional service facility 7.

Upon arrival at the destination (additional service facility 7), the AVP vehicle 10 transmits an arrival notification to the control center 120. The processor 121 of the control center 120 receives the arrival notification from the AVP vehicle 10. The processor 121 transfers the arrival notification to the vehicle management center 110. The processor 111 of the vehicle management center 110 receives an arrival notification from the control center 120. Then, the processor 111 communicates with the AVP vehicle 10 to stop the operation of the AVP vehicle 10 (ignition OFF).

In step S120, the processor 121 of the control center 120 instructs the operator to implement the additional service.

The operator implements the additional service on the AVP vehicle 10. Upon completion of the additional service, the operator arranges the AVP vehicle 10 in the return space 9 described above. Then, the operator notifies completion of the additional service to the control center 120. The processor 121 of the control center 120 notifies the vehicle management center 110 of completion of the additional service.

In step S130, the processor 111 of the vehicle management center 110 communicates with the AVP vehicle 10 to activate the AVP vehicle 10 (ignition ON). Further, the processor 111 communicates with the control center 120 and instructs the control center 120 to execute the movement process. The processor 121 of the control center 120 transmits the movement process instruction information to the AVP vehicle 10. The movement process instruction information indicates the original parking space 4 that is the destination.

In the timing after completion of the additional service, the movement process instruction information indicates instruction of the execution of the "first restart process" described above to the AVP vehicle 10. Furthermore, the movement process instruction information indicates the reference vehicle position. For example, the reference vehicle position is the position of the return space 9. Alternatively, the reference vehicle position may be the position of the AVP vehicle 10 calculated from the imaging results by the infrastructure camera 130.

The AVP vehicle 10 executes the first restart process. That is, the AVP vehicle 10 recognizes the marks 5X installed in the return space 9 and executes the self-position estimation process based on the recognition result of the marks 5X to acquire the latest vehicle position. Then, the AVP vehicle 10 restarts the vehicle traveling control and automatically travels from the return space 9 to the original parking space 4.

What is claimed is:

1. A vehicle adapted to an automated valet parking service in a parking lot, the vehicle comprising:
    a recognition sensor that recognizes a mark around the vehicle; and
    a processor, wherein:
    the processor is configured to execute:
        a self-position estimation process for identifying a vehicle position that is a position of the vehicle in the parking lot based on an installation position of the mark and a recognition result of the mark by the recognition sensor; and
        vehicle traveling control for causing the vehicle to automatically travel in the parking lot based on the vehicle position;
    the processor stores, in a storage device, a final stop position that is the vehicle position at an end of the vehicle traveling control;
    the automated valet parking service includes an additional service implemented on the vehicle during a period in which the vehicle is left in the parking lot; and
    when restarting the vehicle traveling control after completion of the additional service, the processor executes the self-position estimation process in a predetermined return space in which the mark is installed to acquire a latest vehicle position, and restarts the vehicle traveling control based on the latest vehicle position without using the final stop position stored in the storage device.

2. The vehicle according to claim 1, wherein when restarting the vehicle traveling control at a time the vehicle exits from the parking lot, the processor acquires the final stop position stored in the storage device as the latest vehicle position and restarts the vehicle traveling control based on the latest vehicle position.

3. A vehicle control method for controlling a vehicle adapted to an automated valet parking service in a parking lot, the vehicle control method comprising:
    a process of recognizing a mark around the vehicle using a recognition sensor mounted on the vehicle;
    a self-position estimation process for identifying a vehicle position that is a position of the vehicle in the parking lot based on an installation position of the mark and a recognition result of the mark by the recognition sensor;
    a process of storing, in a storage device, a final stop position that is the vehicle position at an end of the vehicle traveling control; and
    vehicle traveling control for causing the vehicle to automatically travel in the parking lot based on the vehicle position, wherein:
    the automated valet parking service includes an additional service implemented on the vehicle during a period in which the vehicle is left in the parking lot;
    the vehicle control method further includes a first restart process for restarting the vehicle traveling control after completion of the additional service; and
    the first restart process executes the self-position estimation process in a predetermined return space in which the mark is installed to acquire a latest vehicle position, and restarts the vehicle traveling control based on the latest vehicle position without using the final stop position stored in the storage device.

4. The vehicle control method according to claim 3, further comprising a second restart process for restarting the vehicle traveling control at a time the vehicle exits from the parking lot, wherein the second restart process acquires the final stop position stored in the storage device as the latest vehicle position, and restarts the vehicle traveling control based on the latest vehicle position.

* * * * *